US005455764A

United States Patent [19]

Meihofer

[11] Patent Number: 5,455,764
[45] Date of Patent: Oct. 3, 1995

[54] REGISTER CONTROL SYSTEM, PARTICULARLY FOR OFF-LINE WEB FINISHING

[75] Inventor: Edward Meihofer, Merced, Calif.

[73] Assignee: Sequa Corporation, Hackensack, N.J.

[21] Appl. No.: 119,286

[22] Filed: Sep. 9, 1993

[51] Int. Cl.[6] ........................................ G05B 13/02
[52] U.S. Cl. .................. 364/161; 364/469; 364/188; 377/17; 226/27
[58] Field of Search .......................... 364/160–163, 364/157, 431.04, 469–473, 188–192; 318/568.15, 603; 226/24, 27, 32, 33, 34, 35, 36, 40; 101/181, 248; 377/17

[56] References Cited

U.S. PATENT DOCUMENTS

| | | | |
|---|---|---|---|
| 4,243,925 | 1/1981 | Gnuechtel | 318/603 |
| 4,262,334 | 4/1981 | Monpetit | 364/431.04 |
| 4,366,753 | 1/1983 | Glanz et al. | 101/181 |
| 4,452,140 | 6/1984 | Isherwood et al. | 101/181 |
| 4,473,009 | 9/1984 | Morgan | 101/181 |
| 4,553,478 | 11/1985 | Greiner et al. | 101/426 |
| 4,694,749 | 9/1987 | Takeuchi et al. | 101/426 |
| 4,994,975 | 2/1991 | Minschaut | 364/469 |
| 5,129,568 | 7/1992 | Fokos et al. | 226/27 |
| 5,222,198 | 6/1993 | Yamamoto et al. | 318/568.15 |
| 5,224,640 | 7/1993 | Fokos et al. | 226/27 |
| 5,267,546 | 12/1993 | Siebet et al. | 123/500 |
| 5,317,614 | 5/1994 | Davis et al. | 377/17 |

*Primary Examiner*—James P. Trammell
*Attorney, Agent, or Firm*—Mitchell D. Bittman; Peter J. Manus

[57] ABSTRACT

A register control system, particularly one that registers marks on a printed web to a function cylinder, produces proportional and integral gains each independently variable to control the take over point of the integral gain with respect to the proportional gain. The accumulating integral gain is zeroed out after cross over if the proportional gain exceeds a preset percentage of the integral error band. The overall system gain is varied with the line speed independently of the proportional and integral gains to provide speed-insensitive control. The direction of automatic correction is always selected to return the system to register in the shortest distance possible. High frequency clock pulses are counted between encoder pulses to interpolate with high accuracy the angular position measurement of the marks and a homing pulse. A real-time analog display presents each revolution of the cylinder as a vector arrow with an inspection zone, set point, registration mark(s) and function cylinder homing point displayed along the arrow. The inspection zone is attached to a selected mark. In a more general form, the system controls the register between moving members such as two rotating shafts.

22 Claims, 11 Drawing Sheets

REGISTER CONTROL SYSTEM, PARTICULARLY FOR OFF-LINE WEB FINISHING

BACKGROUND OF THE DISCLOSURE

This invention relates in general to feedback control systems, and more particularly to a method and apparatus to control the operation of equipment acting on a moving web in coordination with the location of printed material on the web.

In general, it is well known to use feedback loops to control an operation in response to one or more sensed inputs. In the printing industry it is necessary to coordinate the position of a rapidly moving web of paper with the operation of printing cylinders. A common approach is to print a series of registration marks along the web, and then scan the marks. A basic approach introduced by Hurletron is to scan the web for brief intervals in an inspection zone centered on the anticipated position of the mark. A lead inspection zone precedes the mark, followed by a dead zone and a lag inspection zone. Sensed misregistrations in the dead zone are ignored to avoid hunting. Also, the sensed mark is validated; the same mark must be seen in the inspection zone for a predetermined number of successive scans. This control arrangement works well in a printing press, but it works well because the position of a mark does not move relative to the controlled cylinder. It is synchronous with the cylinder. Where the operation is asynchronous, as where there is a cumulative error or an out-of-register splice, the control system does not see the same mark the required number of successive times. No mark is validated, and the system loses control.

In off-press web finishing, e.g. in folding, perforating, gluing, and cutting a pre-printed web, the location of the marks is often not well-determined; they are not synchronous with the cylinder. As a result, conventional on-press controls do not function well for off-press applications, or more generally, for applications where the position of the mark can change significantly, whether due to localized variations or to cumulative variations in the length of the impressions printed on the web. These variations occur because once the web is released from the tight control of the press, variations in web tension due to printing, heating, chilling, handling and atmospherics cause corresponding variations in the dimensions of the web, and hence of the impressions printed on the web. These variations are particularly acute when the printed web is rewound, stored, and then unwound at a later time to be run through a finishing line. They tend to make impressions run consistently longer or shorter than their initial printed length.

U.S. Pat. Nos. 5,129,568 and 5,224,640 to Fokos et al. disclose an off-line web finishing system which overcomes many of the problems of prior art systems that maintain registration by stretching the web, introducing variations in the path length, phasing the operation of the function cylinders, or some combination of these approaches. These prior art systems and their deficiencies are detailed in these patents. With cumulative (synchronization) error, the phasing gears usually are not able to keep up with the error since the error may be greater than the maximum correction rate possible without introducing over correction or hunting. With path length changes, compensating rolls or equivalent structures soon reach their operational limits and cannot accommodate further repeated errors of the same type. Moreover, the dynamic response of known systems often results in system instabilities such as hunting.

The Fokos et al. patents solve these problems in the way machinery in the line is driven. In one form, these patents teach using 1) two drive shafts, a main shaft for web transport and a secondary shaft for the function cylinders, and 2) a continuous ratio adjustment between the speed of operation of the lineshaft to correct for cumulative error. One line drives the other line through a variable transmission or the like to produce the continuous ratio adjustment. Conventional phasing gears at each function cylinder can provide additional adjustment to deal with localized errors. These patents also disclose independent drive motors at each function cylinder, also operated with continuous ratio adjustments with respect to the web transport. While these drive systems provide significant performance advantages over the prior art, they nevertheless have certain drawbacks.

First, transmissions, lineshafts, and other equipment connected between the shafts and driven cylinders introduce some degree of play, which is in itself a source of misregistration. Second, the dynamic response of these mechanical systems is limited in part by the mass of the components and any play or resilience in the system. Third, there is additional cost for a second lineshaft and its installation. Fourth, these systems with known electronic controls do not respond well to massive errors, as occur in connection with splices. The entire line adjusts as soon as a splice is detected at the head of the line. Good impressions downstream are processed out of registration, and continue to be processed out of register, while the system regains synchronous operation. Fifth, the system does not accommodate well to large changes in the line speed, e.g. operation at 500 and 1,000 feet per minute (fpm). The problem is even worse if the speed ranges from manual mode set-up speeds of under 100 fpm to normal line operating speed of 1,000 to 2,000 fpm in an automatic mode. Scanning rates and dynamic system responses that produce satisfactory results at one speed do not function as well at a much different speed. The flexibility of known systems is thus constrained. Sixth, the angular position of the function cylinders in which they act on the web must be initialized into a synchronous start with the registration marks. Seventh, after the initial synchronization the operator has a display of the instantaneous registration error, but there is no indication of the history of the correction process, e.g. its momentum. Nor does any known display assist the operator in finding a registration mark if it is lost, as due to a splice.

In control systems, it is known to use proportional (P) controls, that is, controls where the degree of correction is varied in proportion with the magnitude of a sensed error. A large sensed error produces a larger correction than a small sensed error to hasten the return of the system to a desired condition, e.g. in register. Integral (I) control is also known, where the correction responds to the measured average or integrated error over some preselected prior period of operation. Derivative control is also well known and often used in combination with PI control to form a class of control, PID. The derivative control senses and responds to the rate at which a correction occurs.

As applied to web registration control where there is cumulative error, none of these forms of control have been successful heretofore. Proportional control with cumulative error occurring at high speeds requires large proportional gains. A high gain is needed to deal with the comparatively large recurrent errors and to achieve the necessary register accuracy. But the high gain causes the correction to overshoot the set point (where the system is in register). Hunting occurs as the system oscillates about the set point, or while the system looks for a registration mark which has been over-corrected to a degree that it falls out of the preset inspection zone. Integral controls, in turn, when responding to cumulative errors of the same type, e.g. impressions that are consistently printed long or short, tend to develop a momentum that causes the error correction to overshoot a set point and then oscillate about it, or lose it entirely. The system may settle on the set point, but only after a fairly lengthy interval during which time thousands of feet of printed web are processed out of register and must be scrapped. PID controls have not solved these fundamental problems since they do not automatically accommodate for this change in the error sampling rate that is inherent in register control systems.

U.S. Pat. No. 4,994,975 to Minschart describes a system for off-line web finishing that automatically initializes synchronization between register marks and a processing machine. It selects a registration mark and stores in memory a digital sequence that describes at least one characteristic of the mark. Subsequently detected signals continue to be analyzed and stored in the same manner. Periodically the stored contents of memory are analyzed to locate the selected mark. Finally, the deviation of this selected mark is calculated from 1) a set point position and 2) the position of an operating element of an associated one of the processing machines.

While Minschart recites the use of proportional (P), proportional-integral (PI) and proportional-integral-differential (PID) controllers to produce error correction signals, all three forms are described as suitable and of well-known design. The control advantages purportedly derive from the computer analysis of memory-stored marks to one another and to the position of the machine. This control arrangement does not address or solve the hunting, and validation problems noted above with respect to conventional P or PI systems. The system also requires repeated pattern recognition, e.g. an analysis of a mark by its width, direction of travel and shape. This analysis requires substantial signal processing and capability and is sensitive to irregularities in the printing of the marks or other printed indicia. Moreover, the accuracy of the control remains limited by the ability of an encoder to determine at any instant the precise angular position of the machine element carrying out the process.

It is therefore a principal object of this invention to provide a control system (method and apparatus), particularly one for off-line web finishing, that corrects for both localized and cumulative errors, and is highly stable even with substantial changes in line speed such as variations of a factor of twenty or more.

Another object is to provide a control system which has the foregoing advantages and which can operate with an asynchronous start and which can quickly and reliably accommodate splices, cumulative error, or other asynchronous operating conditions, during operation.

A further object is to provide a system that is highly flexible to accommodate i) different types of web finishing systems such as single or dual shaft drives, variable ratio or fixed ratio systems and (ii) the control of different processes such as registration, cutoff length control, and infeed tension control, and (iii) different modes of control, e.g. manual or automatic.

Yet another object is to avoid the need for a dead zone around the set point.

Still another object is to provide a control system with all of the foregoing advantages that significantly reduces capital cost for hardware (e.g. position transducers, in-register splicers, dual lineshafts) as well as hardware installation time and set up time.

Yet another object of the invention is to provide a system with a graphic display that provides a convenient, real-time, analog display of the correction process.

A further object is to provide an arrangement for greatly enhancing the accuracy of angular position information from an encoder or other standard angular position transducer.

SUMMARY OF THE INVENTION

When used to control the register of function machinery acting on a printed web, an electronic controller produces a registration error signal by comparing signals that measure (i) the location of registration marks on the web that correlate with the location of the printed material, e.g. impressions on the web, and (ii) the angular position of a function cylinder acting on the web. The angular position is preferably determined by an encoder or the like that produces a homing pulse. The controller introduces a proportional gain and an integral gain to the error signal. These gains are scaled to control "take over" point of the integral gain with respect to the proportional gain to operate in a stable manner. The controller zeroes the integral gain if (i) the integral and proportional errors differ in sign, as when the integral error cross the set point, and (ii) the proportional error exceed a preset value, e.g. ±5% of the integral error band. The proportional and integral gains are added algebraically to form an overall system gain that is output as a correction signal to a servo-controlled D.C. motor, or an equivalent drive device, that controls the phase of the function cylinder with respect to the printed pattern on the web. The overall gain is variable as a function of the web speed to make the controls substantially insensitive to the line speed. With a digital controller, the output signal is preferably initially pulse width modulated. In the preferred form, a D to A circuit produces a corresponding analog DC voltage that is applied to the controls for the D.C. motor. The proportional gain and integral gain are separately variable, as is the overall gain.

The controller attaches an inspection zone to a selected registration mark, or like indicia such as shaft angular position, whose position is being controlled. Thus, if there is cumulative error or some other condition producing an asynchronous condition, the controller moves the inspection zone to follow the selected mark. The inspection zone preferably is set to begin half way between the two most widely spaced registration marks. The inspection zone terminates when the selected mark is detected, in this instance the following mark of the two most widely spaced.

To enhance the accuracy of the encoder, or the like, a high frequency clock signal is counted between encoder pulses. The time intervals between a measured point and the preceding and following pulses, given a fixed clock rate, form a time interval ratio that interpolates the angular position of the function cylinder between the pulses. The clock rate is selected in coordination with system parameters such as the line speed. The rate should produce the needed degree of resolution and accuracy at line speeds ranging from very slow, e.g. 20 to 30 impressions per minute during set up operation in a manual or automatic mode, to 1,000 to several thousand feet per minute during production operation in a fully automatic mode.

To enhance the operator control, the system includes an LCD display or the like with an analog vector arrow displayed in real time whose length corresponds to the actual impression length, and whose direction reflects the direction of travel of the web. The homing point on the encoder is defined as the head of the arrow. Sensed registration marks, a set point, and an inspection zone are displayed along the arrow with their position on the arrow corresponding to their actual position along the length of web under inspection during that revolution of the function cylinder. Error corrections are displayed as the linear distance along the arrow between the set point and a selected registration mark. The inspection zone is displayed, in the preferred form, as a bar extending under the arrow from a start point half way between the two most widely spaced marks to the selected mark. The actual movement of the mark and the attached zone on the display shows in a graphic, real-time form the direction and speed of the register correction. The display preferably also includes digital readouts of parameters such as the line speed, set point, the error expressed in mils from the set point, the mode of operation—e.g., manual or automatic, and the rate in percent of the correction being applied. A keyboard associated with the display inputs changes of the operating parameters.

These and other features and objects will be more readily apparent from the following detailed description which should be read in light of the accompanying drawings.

BRIEF DESCRIPTION OF THE DRAWINGS

FIG. 8-1 to 8-3 is a flow chart showing the operation of the control system shown in FIG. 6;

DETAILED DESCRIPTION OF THE PREFERRED EMBODIMENTS

Figure 1:
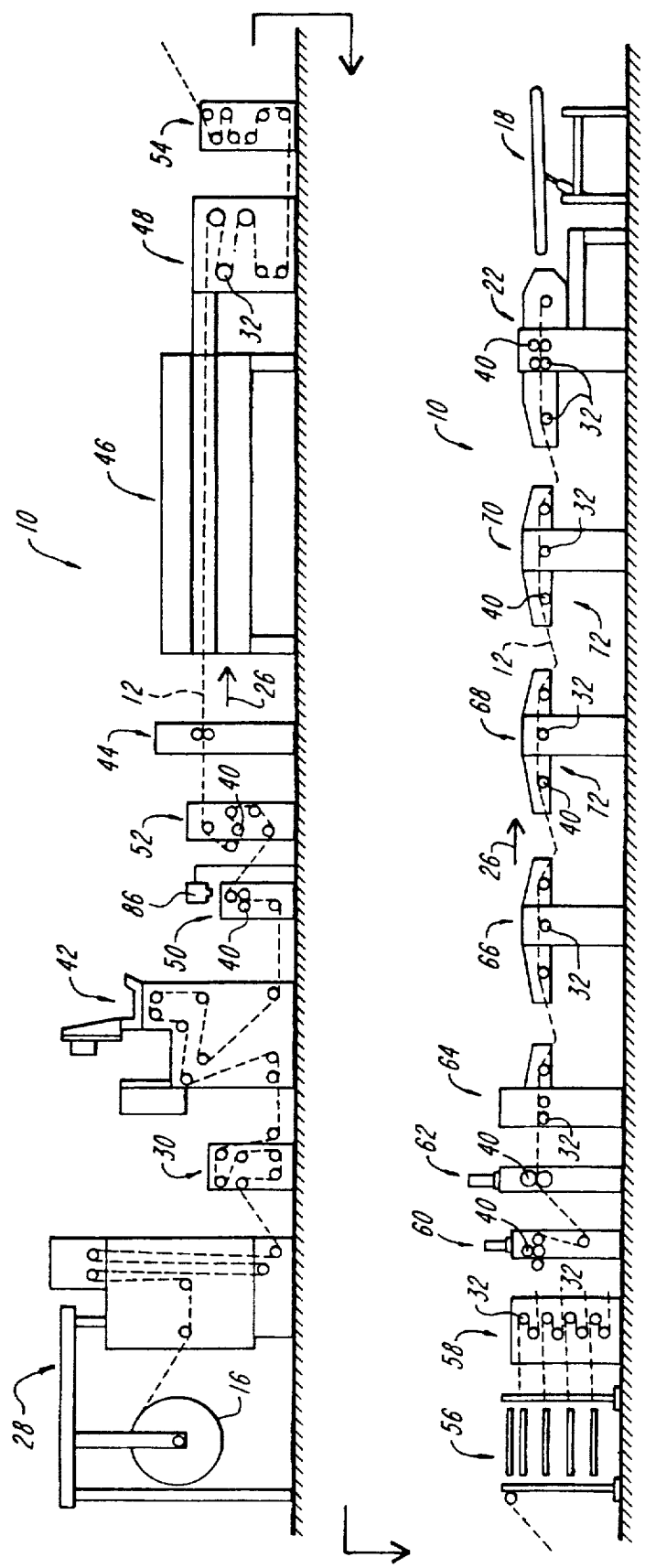
FIG. 1 is a simplified view in side elevation of an off-line web finishing system operated with a control system according to the present invention.
Figure 2:
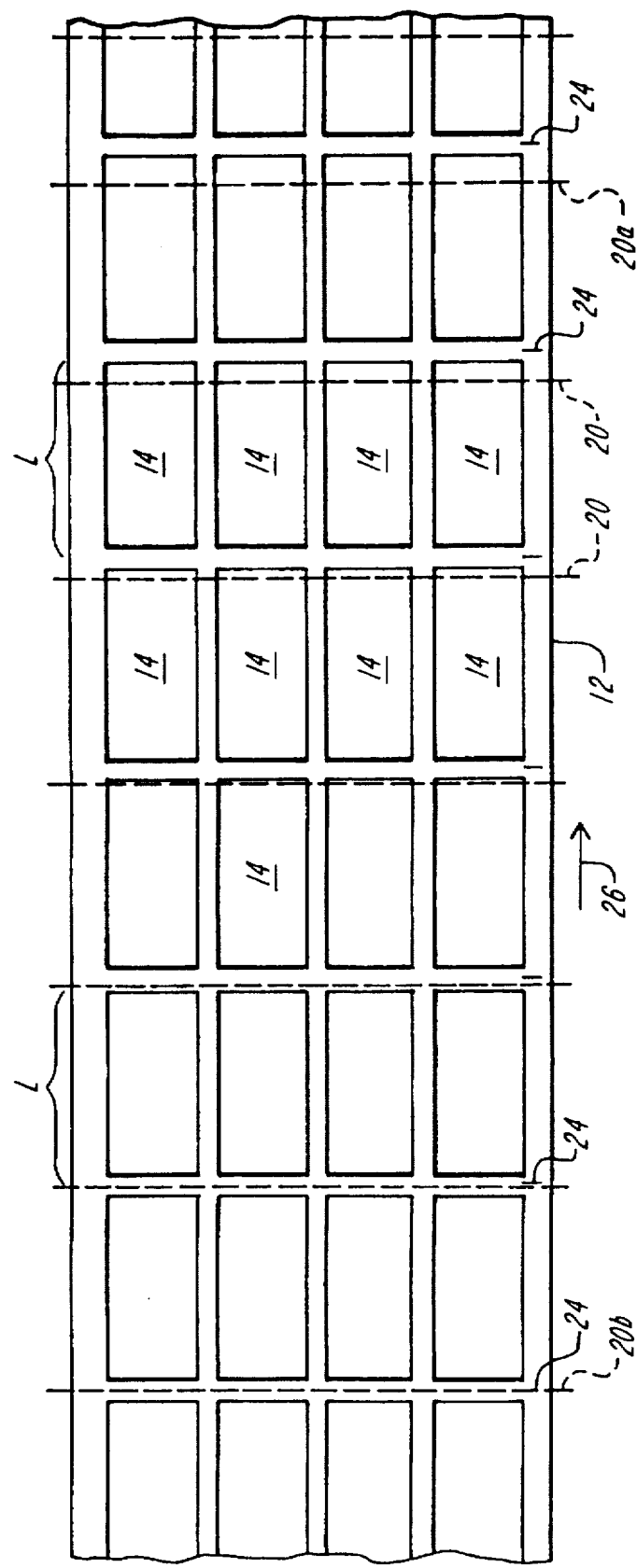
FIG. 2 is a top plan view of the printed web shown in FIG. 1.

FIGS. 1–4 show an off-line web finishing system 10, a principal application of the control system of the present invention. Most of the following description will describe the invention operating in the context of off-line web finishing. A web 12 previously printed with a series of impressions 14 (FIG. 3) is unwound from a roll 16 and fed through the finishing line (FIG. 1). The line performs multiple functions on the web, usually more than twenty, and delivers a processed product, such as a signature used to form a magazine, to a delivery conveyor 18 at the end of the line. The impressions have a repeat length L (FIG. 2) along the longitudinal axis of the web which typically corresponds to the circumference of a print cylinder, 630 mm being a common value. Because of the elastic and environmentally sensitive nature of paper, the repeat length of the impressions 14 can, and usually will, vary from the expected length. FIG. 2 shows a cumulative error where the impressions are each printed long. The transverse dashed lines 20 illustrate where a finishing function, such as the operation of a rotary cutter, will fall on the web in the absence of correction. While the problem as illustrated in FIG. 2 is exaggerated, it clearly demonstrates how cumulative errors of the same type (a long or short repeat length) can rapidly lead to a cut 20a within an impression, not between impressions as shown at 20b. A web cut at 20a is not usable. Besides the cumulative errors, the paper may expand or contract locally in a highly unpredictable manner resulting in localized and rapidly changing positional errors that can also be of a sufficient magnitude to result in an operation being performed on the web so as to destroy the product.

Figure 3A:
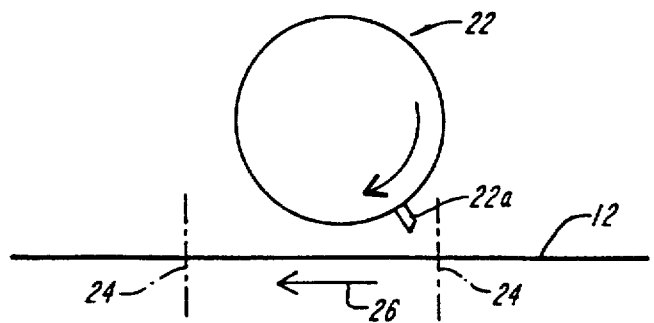
FIGS. 3A and 3B are schematic views in side elevation of a rotary cutter rotating in coordination with the moving web shown in FIGS. 1 and 2.
Figure 3B:
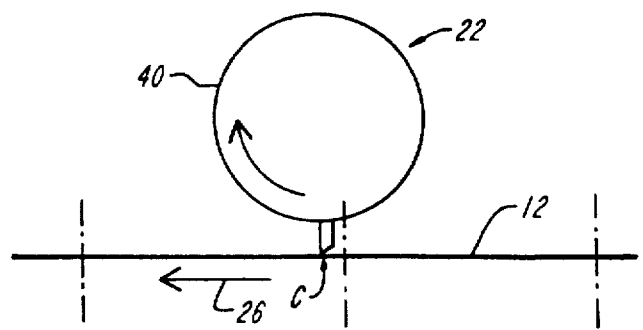

FIGS. 3A and 3B illustrate in a simplified manner the timing between the operation of a function cylinder, here a rotary cutter 22, and the web. In FIGS. 3A and 3B dashed lines 24 represent the location of registration marks on the web. There are typically several marks per impression. The control system sees all of the marks, but controls the position of one selected mark. As is well known, the mark is not necessarily an actual mark; it can be any feature on the web that denotes position, for example, a white space between printed areas. In non-printed web applications, such as the control of the angular position of a cylinder, the mark can be a magnet secured on the cylinder or a homing point on an encoder mounted on the cylinder shaft. The web in FIGS. 3A, 3B moves in the direction of arrow 26. In FIG. 3A a blade 22a is rotating toward a cutting position where it impacts on the web for an instant. In FIG. 3B the blade has rotated in conjunction with an advance of the web to cut the web at point C. This illustrates a misregister since the cut occurs ahead of the desired location on the web.

Figure 4:
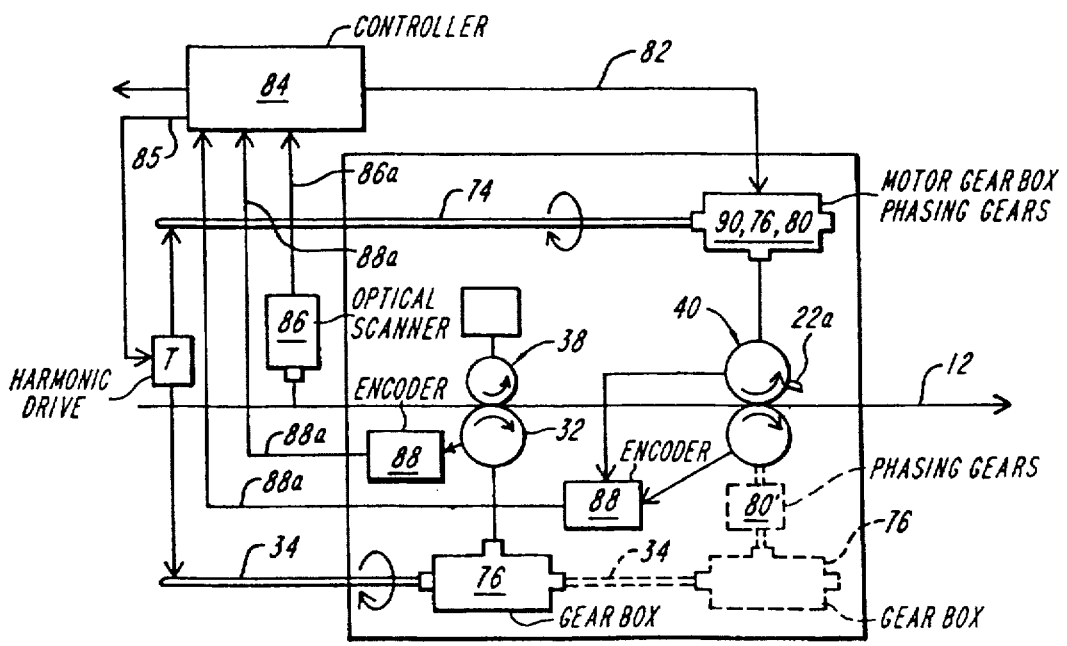
FIG. 4 is a highly simplified schematic view in side elevation of the rotary cutter shown in FIG. 1 with the cutter driven by a second drive shaft coupled to a main lineshaft through a variable ratio harmonic drive.

The system 10 begins with a splicer 28 that feeds the printed and rewound web from the roll 16 to an infeed device 30 having draw rolls that in turn feed the web to the rest of the line of finishing equipment. As will be discussed in greater detail below, a significant advantage of this invention is that it is not necessary to use an in-register splicer. The infeed device, such as the web guide and infeed sold by MEG as model 640H, sets the tension in the web. The desired value for the web tension is selected at the infeed and it varies the web feed rate to maintain the tension at the desired value. Draw rolls 32 for all of the equipment in the system 10 are driven in unison from a common lineshaft 34 (FIG. 4). Conventional gear boxes 76 couple the lineshaft to shafts that each mount one of the draw rolls. The rolls 32 convey the web 12 through the system 10 at a substantially constant tension, and at any of a wide range of speeds, e.g. from 20 to 2,000 feet per minute (fpm).

The set, generally constant level of tension will depend on the characteristics of the web and the finishing operations performed. In a typical finishing line, the tension for very light weight webs such as tissue used to form airmail envelopes will be set at a correspondingly low value, such as 0.3 pounds per linear inch (pounds-force divided by the width of the web in inches). As described in more detail in U.S. Pat. Nos. 5,129,568 and 5,224,640, the disclosure of which is incorporated herein by reference, in each case the tension should be sufficient only to facilitate the handling and finishing of web, but not sufficient to stretch the web as occurs in conventional printing and finishing equipment.

There is substantially no slippage between the draw rolls and the web. The draw rolls act in cooperation with air loaded trolley nips 38 (FIG. 4) or opposed rolls which secure the web to travel in unison with the draw roll. Because all of the draw rolls are driven from a common lineshaft, they rotate at the same speed which avoids variations in the rate of travel of the web which can produce variations in the tension in the web.

The system can include equipment such as an imager 42, a segmented remoistenable gluer 44, and a dryer 46. The application of wet ink and glue and then the drying, induce some changes in the characteristics of the web. While the change in tension is comparatively minor, typically less than ±5%, it is automatically and continually compensated for by the infeed 30 so that the web leaving chill rolls is at the constant preselected value, despite the presence of moistening and drying operations in the finishing line.

The web finishing system also includes a pattern perforator 50, a sequential numbering unit 52, the chill roll 48 located after the dryer 46, a silicone applicator 54, a ribbon deck 56 that slits the web into plural parallel ribbons, a compensator unit 58 that maintains registration between parallel ribbons formed in the web, a rotary die cutter 60, an envelope gluer 68, plow stations 64, 66, 68 and 70 each with at least one draw roll powered from the main lineshaft, and the rotary cutter 22 which has the final draw roll in the line. The plow stations 68 and 70 also include spot gluers 72,72 associated with function cylinders 40,40. As will be understood by those skilled in the art, the line illustrated in FIGS. 1 is exemplary only. A wide flexibility exits in adding or deleting equipment from the line, or in a selectively deactivating one or more pieces of equipment which are not required to produce a particular product.

Certain of these pieces of equipment, the dryer, chill rolls, silicone applicator, ribbon deck, compensator, and the plow stations, operate on the web without regard to the location of printed mater on the web. They are registration insensitive. Other pieces of equipment, the pattern perforator, numbering unit, segmented gluer, die cutter, envelope gluer and rotary cutter are registration sensitive. Each has at least one function cylinder 40 that performs an operation on the web which must be precisely coordinated with the printed pattern of impressions on the web. As shown in FIGS. 3A and 3B, on the rotary cutter the function cylinder carries the blade 22a; the operation of this function cylinder is a cut across the web.

In the form shown in FIG. 4, the main lineshaft 34 drives a secondary lineshaft 74 through a harmonic drive T. Gear boxes 76 transmit power from the shaft 74 to the function cylinders 40 via shafts and phasing gears 80. Motors associated with the phasing gears 80 and acting under the control of signals over lines 82 from a controller 84 provide a phase adjustment between the angular position of the shaft 74 and the associated function cylinder 40. The control signals on the lines 82 correspond to the difference in the position of 1) the registration marks on the web, as sensed by an optical scanner 86 associated with each piece of registration sensitive equipment, and 2) the angular position of the function shaft as sensed through a conventional encoder 88. The phasing gears 80 provide a registration adjustment that "fine tunes" the registration control system, principally by correcting for localized errors. Control signals over line 85 to the harmonic drive continuously vary the speed ratio between the main lineshaft 34 and the secondary lineshaft 74. This provides a correction for cumulative error. For clarity, only one scanner 86 is shown in FIGS. 1 and 4, but it will be understood that in the preferred form one such scanner is located adjacent each registration sensitive piece of equipment in the line. The scanners 86 also preferably monitor each impression, as opposed to monitoring periodically, e.g. every ten or twenty impressions. Suitable scanners 86 are sold by SICK Optic-Electronic, Inc. of Eden Prairie, Minnesota under its trade designation MX10.

In the presently preferred form, there is only one lineshaft, the main shaft 34. It is coupled through gear boxes 36 to the draw rolls and, via phasing gears 80' (shown in phantom) to the function cylinders 40. The dynamic response and accuracy of the present invention make it possible to control in the asynchronous environment of off-line finishing without dual shafts and a continuous ratio adjustment between them, heretofore a preferred approach for off-line finishing.

Figure 5:
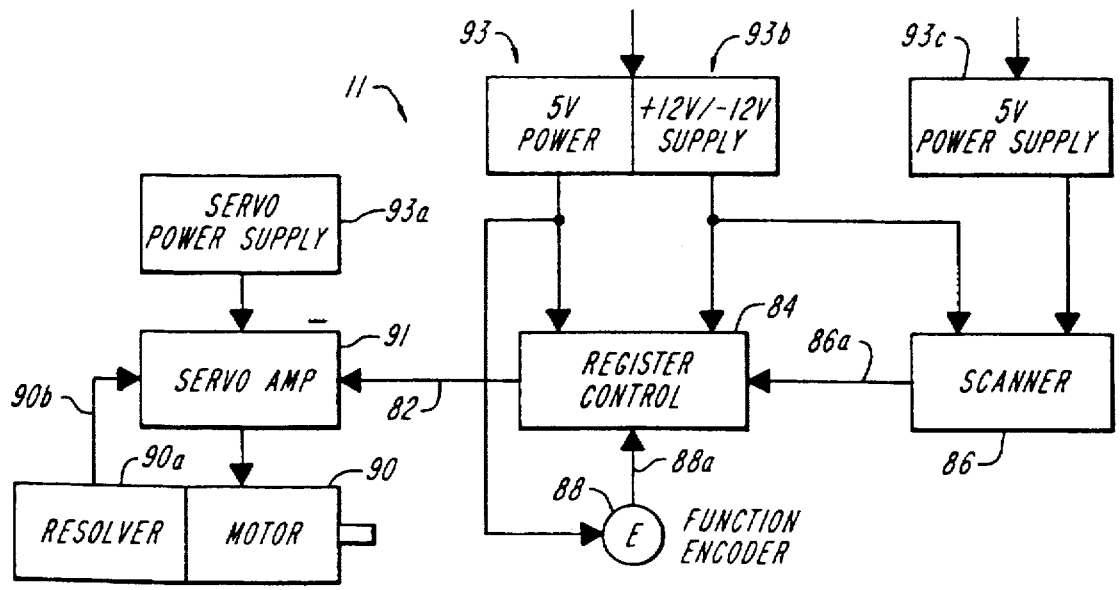
FIG. 5 is a high level schematic block diagram of a control system according to the present invention for use on the line shown in FIGS. 1–4.

FIG. 5 shows in block diagrammatic form the broad structure of the control system 11 of the present invention. A motor 90 makes a correction of a sensed misregistration. The motor 90 can make the correction in any of a variety of ways, depending on the application and the nature of the physical system making the error adjustment. For example, the motor can adjust an associated one of the phasing gears 80 or 80' or it can directly drive one or more function cylinders, or it can adjust a variable transmission or the harmonic drive T. The controller 84 receives signals from the scanner(s) 86 over line 86a and from the encoder(s) 88 over line 88a. If the controller 84 calculates that there is a register error, it generates an error correction signal indicative of the magnitude and direction of the error that is applied over line 82, via a servo amplifier 92, to the motor 90. The motor 90 includes a resolver 90a which outputs its angular position as a signal over line 90b to the servo amplifier 91. The encoder 88 is of conventional design which generates 500 pulses per revolution and has a homing pulse. A power supply 93 includes a servo power supply 93a, a 5 V and ±12 V power supply 93b for the controller, scanner and encoder, and 5 V power supply for the scanner. The precise values and arrangement of the power supply can, of course, vary widely.

Figure 6:
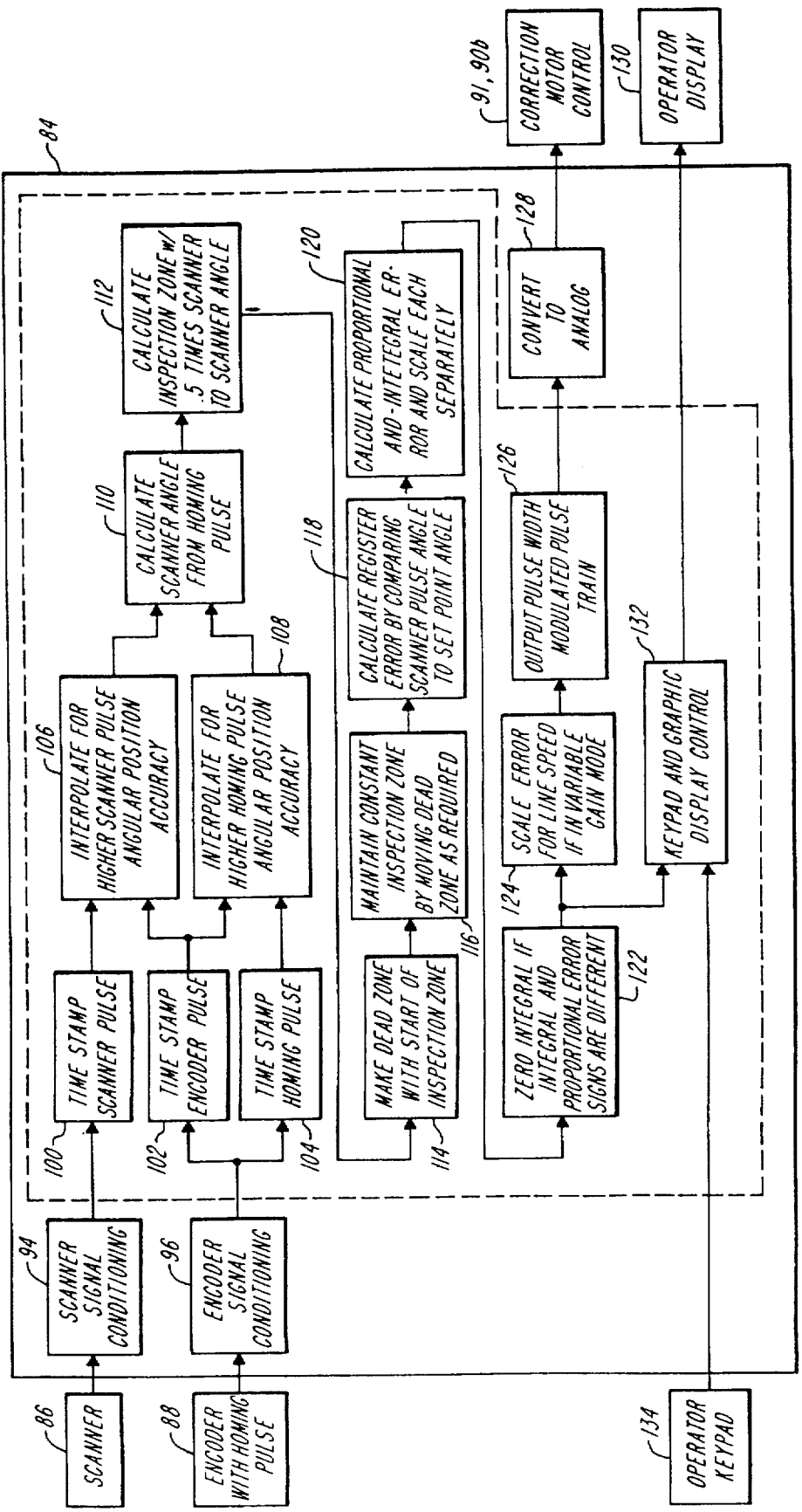
FIG. 6 is a more detailed block diagram of the electronic control system shown in FIG. 5.

FIG. 6 shows in block diagrammatic form the operation of the controller 84, based on a standard microprocessor. Inputs from the scanner and encoder are conditioned at blocks 94 and 96. Conditioning can include filtering, but ordinarily constitutes signal amplification, e.g. as provided by a series coupled pair of inverting operational amplifiers. In a broad overview, the controller 84 uses these signals to calculate (i) the position of the selected mark (the interpolated angular position of the scanner pulse) measured from the homing pulse, and the position of the function cylinder (the interpolated angular position of the encoder) also measured from the homing pulse. It then calculates registration error by comparing the actual scanner angular position to that of a set point, that is, the desired "angular position" of the web measured in each revolution of the function cylinder. Important features of the present invention include the time interpolation of these angular positions between encoder pulses, attaching an inspection zone to move with a selected one of the registration marks, use of proportional and integral error corrections adjusted independently, zeroing of the integral error correction if it differs in sign from the proportional error and exceeds a preselected percentage of the integral error band, and independently varying a system error signal to adjust for line speed variations.

To produce these features, the controller 84 time stamps the scanner pulses at block 100 and each pulse of the encoder at block 102, as well as its homing pulse, at block 104. These stampings use the microprocessor clock, e.g. operating at 1 MHz. Since distance = rate X time, and since the rate (line speed) is constant for any short period of time, e.g. the time to move one encoder pulse, a time measurement is equivalent to a distance measurement. Further, since distance can be expressed as position along the circumference of a cylinder of a fixed diameter, these time measurements in conjunction with counted encoder pulses also measure angular position of the function cylinder 40.

By counting these clock pulses between encoder pulses one can calculate a first time interval $\Delta T1$ from a leading encoder pulse to a position of interest, e.g. a scanner pulse or homing pulse, and a second time interval $\Delta T2$ from that pulse to the next encoder pulse. The ratio of the first time interval to the second time interval, $\Delta T1/\Delta T2$, when compared to the time interval of the preceding encoder pulse and the following encoder pulse, produces a very accurate measure of the distance between the encoder pulses to the sensed pulse to be located. Block 106 calculates this interpolation for scanner pulses and block 108 calculates this interpolation for homing pulses. Thus, knowing the angular positions of the homing pulse and scanner pulse to a high degree of accuracy, block 110 calculates the angle A (FIG. 9) from the homing pulse to the scanner pulse to determine, with a like degree of accuracy, the angular position of the scanner pulse, and therefore the selected mark, with respect to the function cylinder.

By way of illustration, but not of limitation, if the encoder 88 generates 500 evenly spaced pulses per revolution, and if about 48 inches (1,219 mm) corresponds to one revolution of the function cylinder 40, then each encoder pulse represents 0.096 inches. In the preferred embodiment of this invention a 16 bit counter is employed to count the microseconds between encoder pulses. This then limits the maximum count to 65,535 counts per encoder pulse. If we specify a minimum speed to maximum speed automatic control speed ratio of 20:1, and assume a maximum speed of 1,000 fpm, then at the minimum speed of 50 fpm we must select our counter not to overflow the 65,535 counts. This would give us, theoretically, a measured accuracy of 0.000001465 inch at 50 fpm and a reduced measured accuracy of 0.00002929 inch at 1,000 fpm.

The controller 84 next calculates an inspection zone. It is preferably started at half the angular distance between the two most widely spaced marks sensed by the scanner. Block 112 makes this calculation. Block 114 makes an inspection dead zone equal the start of the inspection zone at this half way point. (The inspection dead zone represents the zone during which all scanner pulses are ignored. It should not be confused with the dead zone other systems employ at the desired register set point.) The inspection zone then continues until the system scans the next mark, which is the selected mark that the control system works to bring into register.

A principal feature of the present invention is that the inspection zone is "attached" to this selected mark. The zone moves with the selected mark as it moves with respect to a known location, such as the homing point, whether due to cumulative error, web slippage, localized changes in web tension, a splice, movement of the registration mark in response to register error correction, or otherwise. The control system thus follows the variable being controlled (the mark). This represents a fundamental departure from conventional systems. Block 116 produces this result. As the selected mark moves (its angular position, as calculated at block 110, changes from revolution to revolution), the start position of the inspection zone moves correspondingly.

This attachment gives the control system of the present invention the ability to deal with asynchronous error with great stability. If there is substantial cumulative error, as noted above, conventional systems have great difficulty validating a mark A selected mark, due to the cumulative error, "drifts" through a fixed inspection zone (a set angular range of positions on the function cylinder). After multiple revolutions, the selected mark falls outside the inspection zone and control is lost unless the registration control system has a dynamic response capable of quickly and reliably correcting for this error. In the past, the necessary required dynamic response has led to instability through hunting.

The attachment of the inspection zone to the selected mark also allows an asynchronous start, or a "re-start" as occurs if there is an out-of-register splice or missing registration marks. In these situations, the scanner continuously reads marks, the angular position is accurately determined at block 110, and an inspection zone is calculated at block 112. Blocks 114 and 116 then establish a suitable inspection zone on a selected mark. The controller 84, as described in more detail below, quickly brings this selected mark to a preselected set point to produce registration. The control system does not "lose" the mark despite asynchronous drift or correcting movement because the inspection zone follows the selected mark under the control of the block 116. When splicing, the ability of the control system to rapidly reestablish registration on the run reduces the need for an in-register splicer.

Block 118 determines if there is a registration error by comparing the angular position of the selected scanner pulse to the angular position of the set point. The sign of the error determines if the error leads or lags the set point. This error signal is then processed in blocks 120, 122 and 124 to produce a digital output error correction signal at block 126 that is in a pulse-width-modulated (PWM). Block 128 D to A (digital-to-analog) converts the PWM signal to an analog signal that is applied to a control for each motor 90, here the associated servo-amplifier 91 with feedback from the motor resolver 90a.

The block 120 calculates a proportional (P) error signal as a function of the magnitude (absolute value) of the error signal from block 118. The proportional error signal is produced by adding a proportional error gain. Independently, an integral error signal is calculated by continuously accumulating the error signal at fixed time intervals, to produce an integral error that reflects total accumulated register error. Independent and variable proportional and integral error gains (and therefore P and I corrections) are a central component of the present invention.

In a variable gain mode, the maximum proportional gain is determined by system parameters such as line speed, sample rate, the dynamic response of the actual register correcting components, and whether the system is operating in a fixed or variable ratio (of lineshaft to function cylinders). By way of example, the central system can be set such that a maximum (100%) proportional error correction signal of ±10 volts at a given line speed produces a ±1 inch/second correction rate in the register. Therefore to correct a 10 inch register error, e.g. one occuring after a splice, results in the application of maximum integral and proportional gains (100% each), but since the maximum output is limited, this will result in an output of 10 volts. After 9 seconds of operation, the mark moves 9 inches (1 inch per second), and remains 1 inch out of register. As the error falls below 1 inch toward zero, the proportional gain also falls from 100% toward zero. However, the integral gain remains at 100% since the accumulated error of the system is still resulting in maximum integral output. The integral gain thus assumes dominance over the control, causing the correction to overshoot the set point. After cross-over, the proportional error signal begins to grow, but it drives a correction in the opposite direction to the integral error gain and the accumulated error begins to reduce. This situation, if uncorrected, results in instability, or at least a very long period of time to stabilize on the set point. During this time, web is being run out of register and is wasted. In the present invention, as the direction of the proportional error becomes reversed and as soon it exceeds a small selected amount (e.g. 5% of the accumulated error band), the integral or accumulated error is cancelled thereby reducing the system overshoot and stabilizing the system at the set point.

A principal feature of the present invention is that the P and I gains are each scaled independently to a ratio to control the "take over" point X (FIG. 10) where the integral error dominates the correction.

Another principal feature of the present invention is that block 122 controls this integral error overshoot by electronically zeroing out the integral error if the signs of the integral and proportional errors differ. This zeroing eliminates the built up or total accumulation of register error when the system has reached the desired register set point. Since maintaining an accumulative or integral correction is desirable for eliminating steady state errors, the integral error is zeroed only if its direction of correction is opposite the proportional correction, and only if this proportional error exceeds a predetermined amount. This allows normal PI operation, eliminates overshoot for the steady state errors, and correcting large, step-type errors such as can occur at the time of misregistered splices. Block 122 zeroes the integral error only if the proportional error exceed a small, preselected percentage, e.g. ±5% of the absolute value of integral error band. Expressed in volts, an integral error band of ±10 volts would require that the proportional error exceed ±0.5 volt before the integral error correction is zeroed. The actual proportional error required to zero the integral error is system dependent and as such can be varied at the initial system start up.

Block 124 varies the overall system gain (the algebraic sum of the integral and proportional errors) as a function of the line speed to make the register control substantially insensitive to the line speed when the system is operating in a variable gain mode, which is the normal operating condition for the web-finishing system described.

Correction signal information from block 122 is also output to a display 130, e.g. a conventional LCD display driven by a conventional keypad 134 and graphic display control 132 such as a Cybernetic Microsystems CY325 LCD windows controller.

Figure 7A:
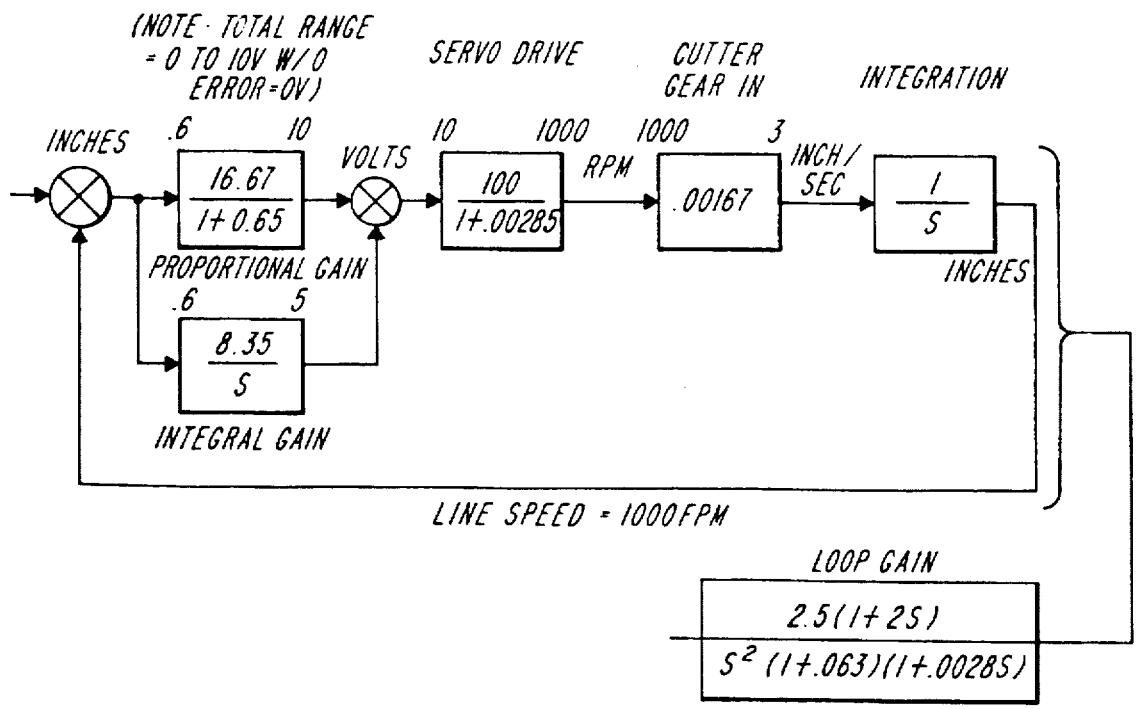
FIG. 7A is an equivalent system diagram of the feedback control loop of the present invention at a line operating of speed 1,000 fpm.
Figure 7B:
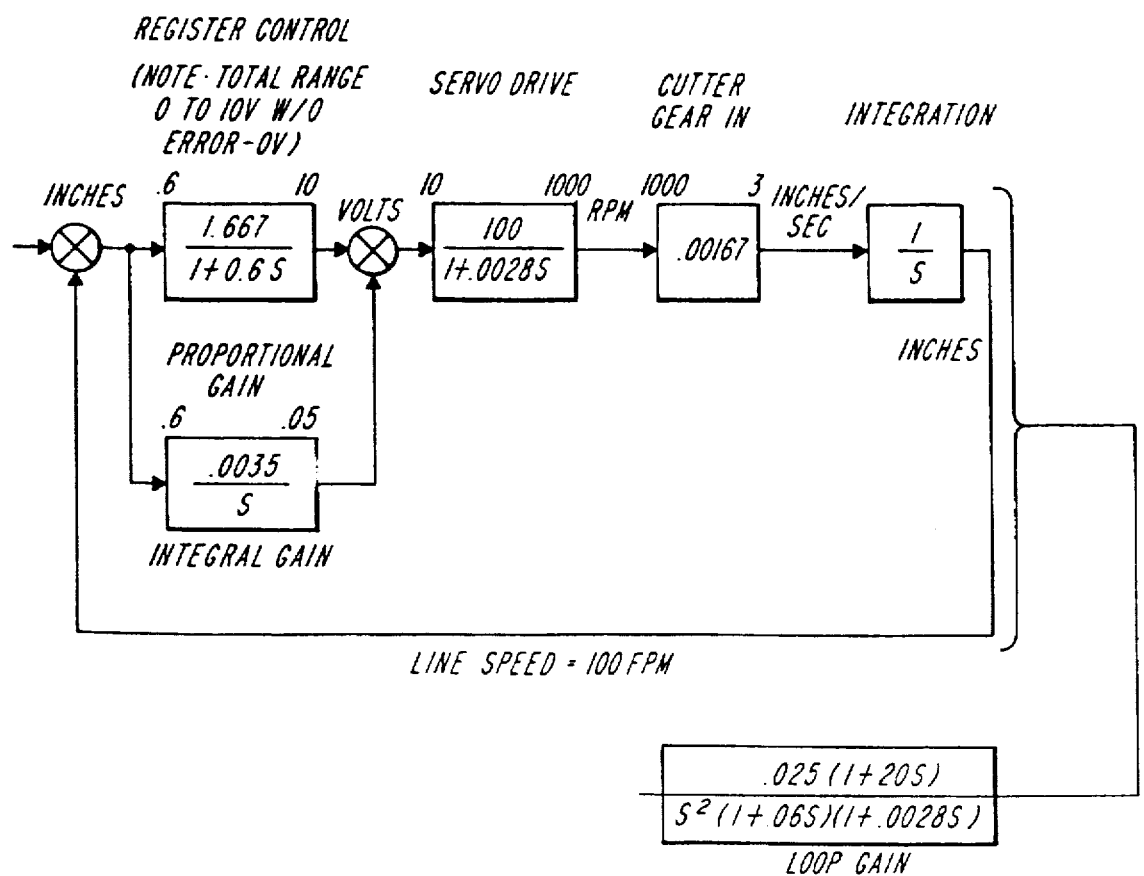
FIG. 7B is a diagram corresponding to FIG. 4A at a line operating speed of 100 fm.
Figure 10:
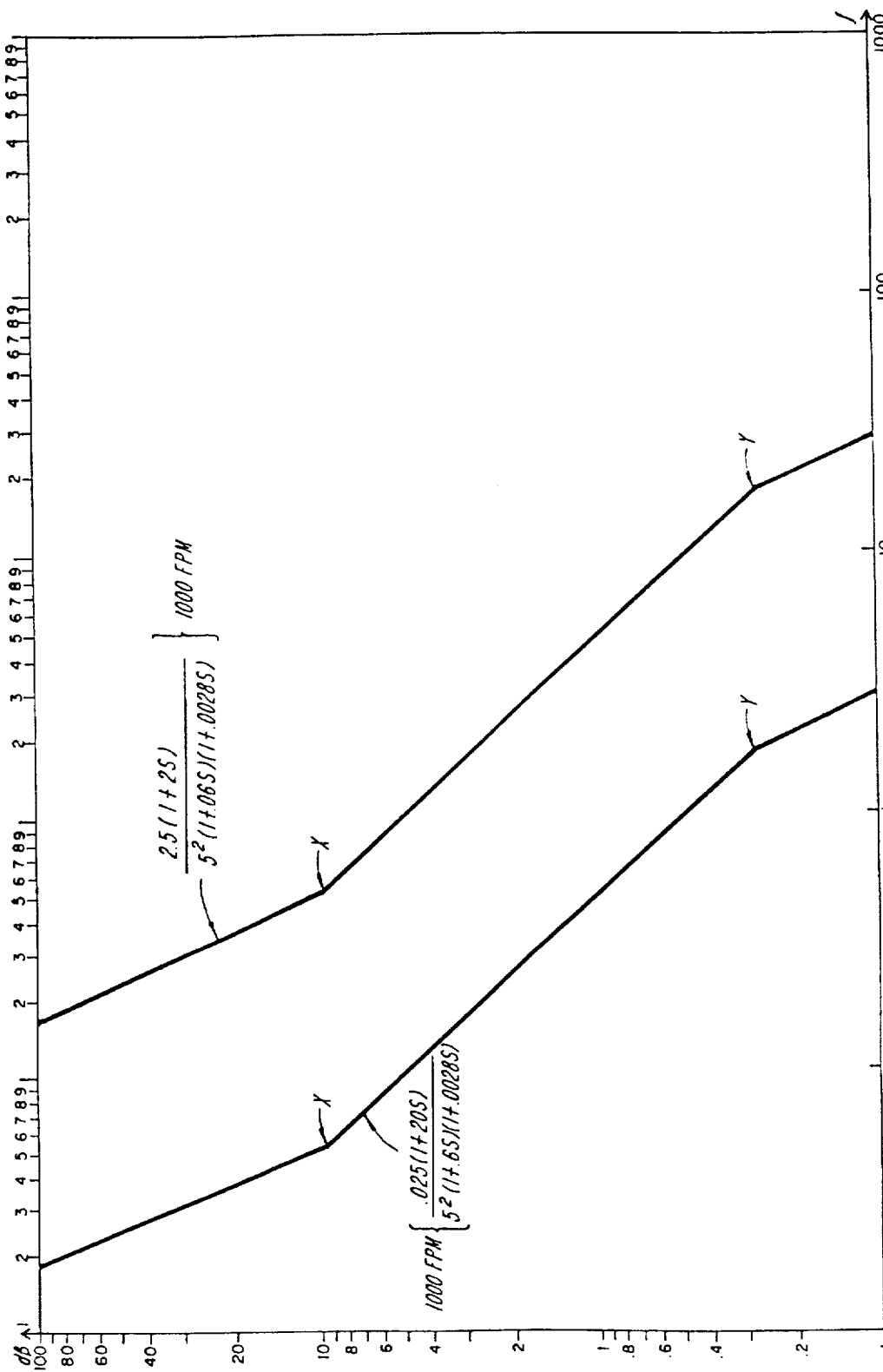
FIG. 10 is a Bode diagram of system gain at 100 and 1000 fpm as a function of frequency.

FIGS. 7A and 7B show the closed-loop control system in standard transfer function block diagram form for the ±10 volt = ±1 inch correction rate example as applied to the control system described above with respect to FIGS. 1–6. In the drawings "s" represents the standard Laplace transform variable, presented in conventional form. FIG. 7A demonstrates values for a line speed of 1000 fpm and FIG. 7B shows the same system at 100 fpm. At 1000 fpm, the proportional gain produces a correction 10 volts with a 0.6 inch error and the integral gain produces 10 volts with a 0.6 inch error in 1.2 seconds. The servo amplifier 91 is set so that 10 volts error signal corresponds to a 1800 rpm correction by the motor. This correction at the gear of a function cylinder, here a rotary cutter, produces a linear correction rate of 3 inches/sec. The integration block shows the correction is cumulative over time. If one integrates over one second, the correction totals 3 inches. At 100 fpm, the same elements produce one-tenth of the correction. Each gain expressed as a maximum error voltage signal is reduced proportionally with the change in line speed, from 10 volts to 1 volt for the proportional error and from 1.2 seconds for 10 volts to 12 seconds for the integral error. Each correction is slower at 100 fpm than 1000 fpm. In the example, the P and I gains are scaled in a 2:1 ratio to produce a take over point for stable operation with line speed variations over a 10:1 range, as shown. FIG. 10 is a corresponding Bode plot of these feedback loops.

Figures 1, 8:
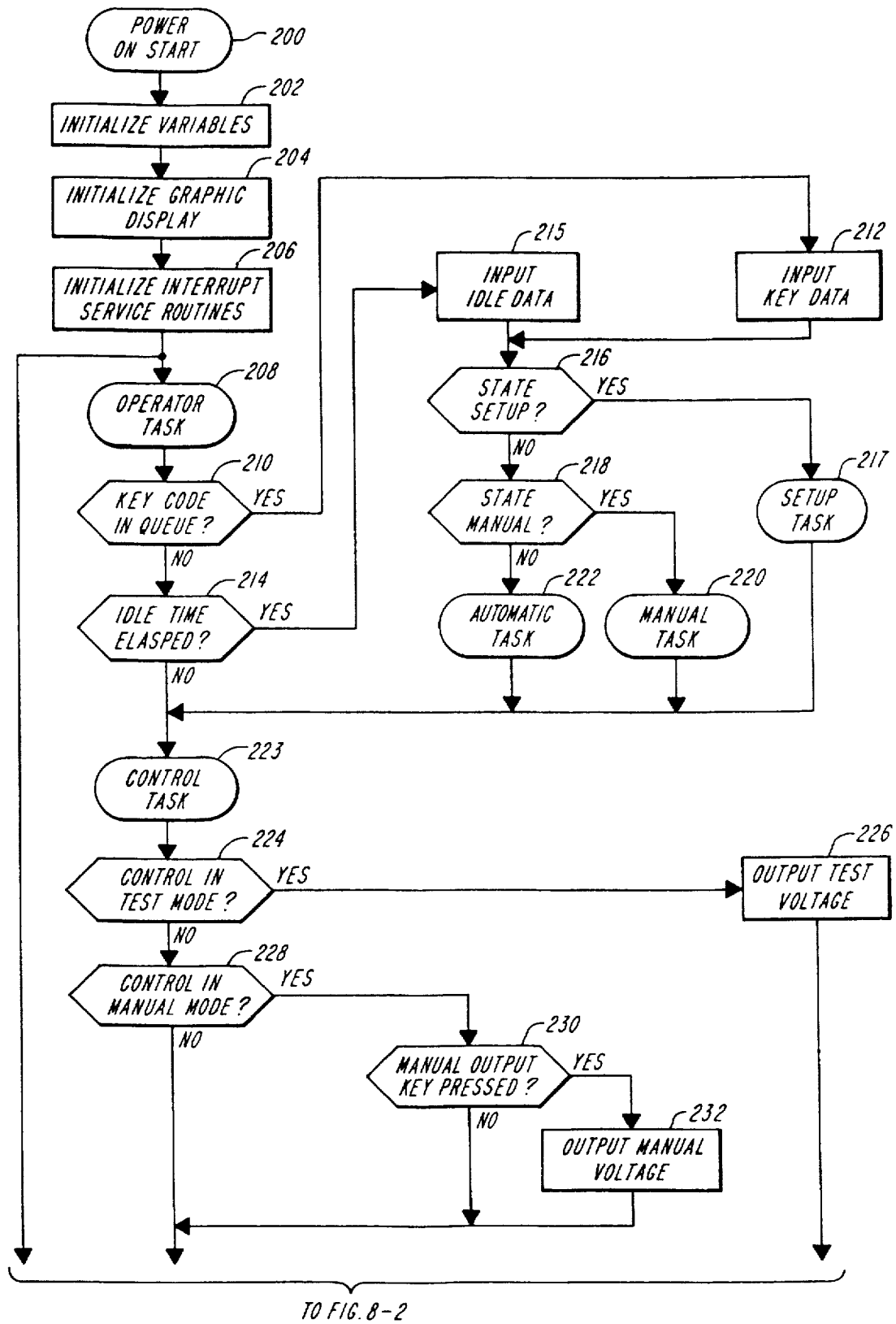
Figures 2, 8:
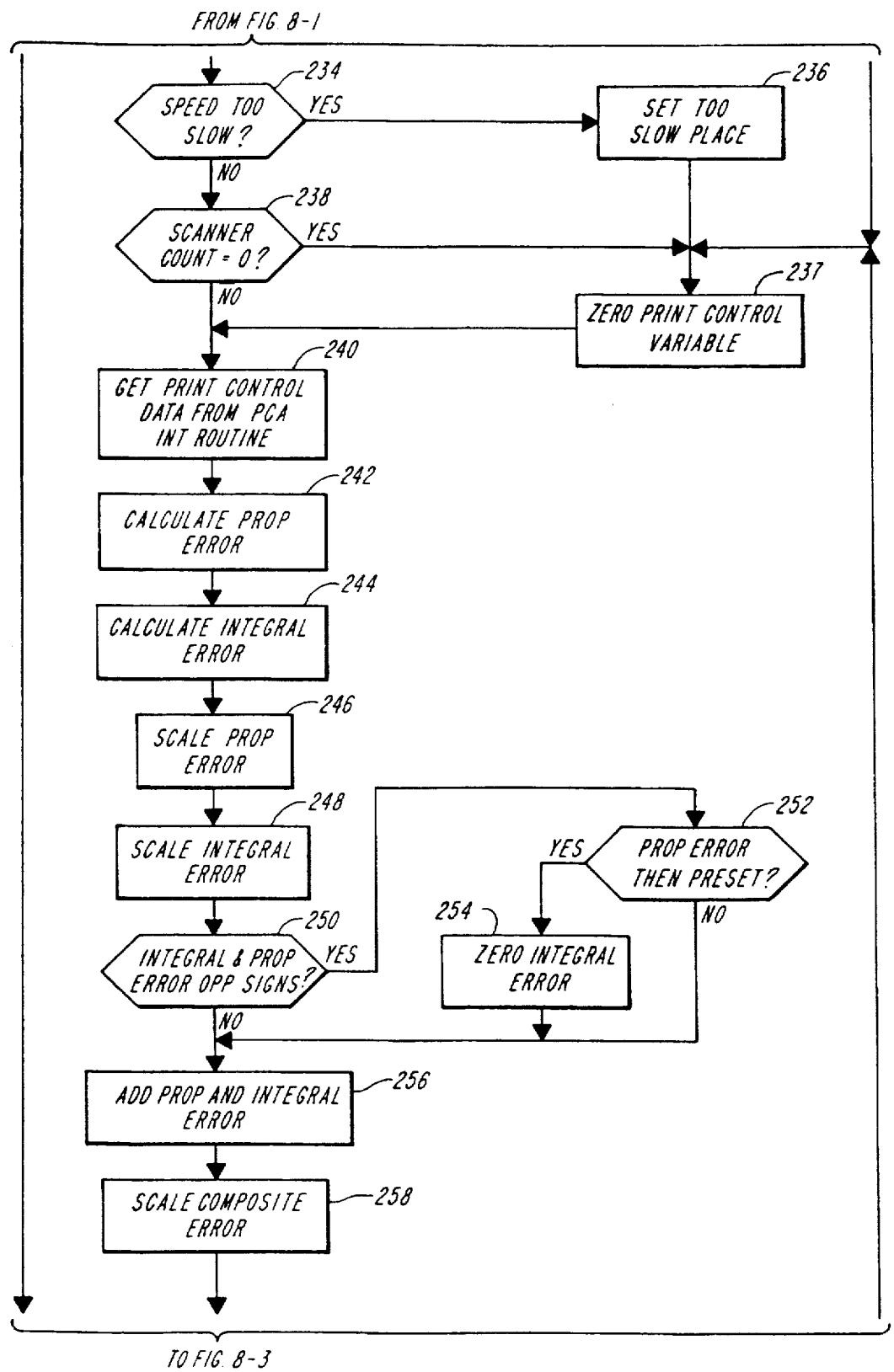
Figures 3, 8:
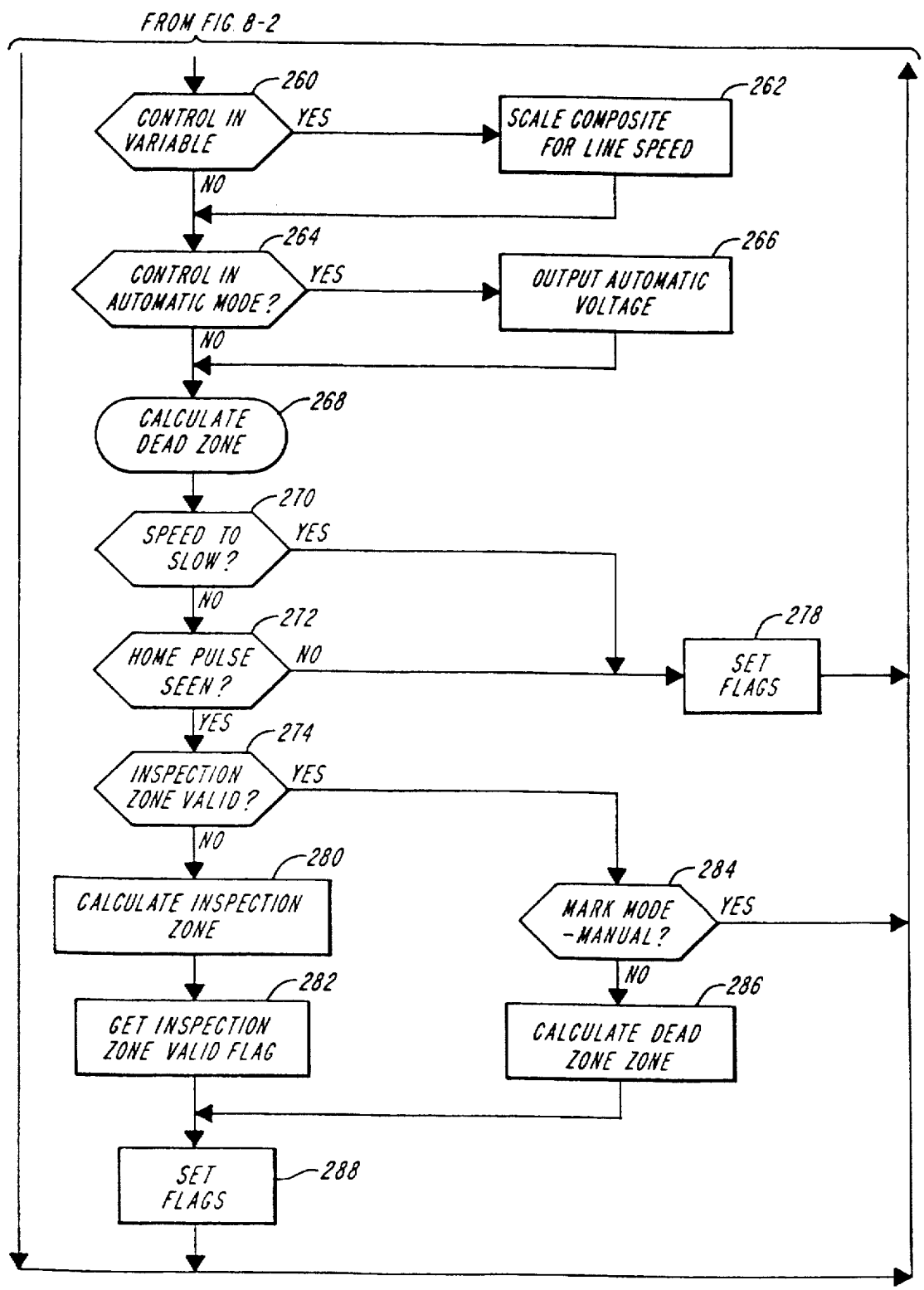

FIGS. 8–1 to 8–3 is a detailed flow chart of the control system of FIGS. 5 and 6 used to control an off-web finishing line as shown in FIGS. 1–4. The control sequence starts at 200 with an operator task of pressing a power on or start key. The program then boots itself up to initialize variables, the graphic display and interrupt service routines shown at 202, 204 and 206. At operator task 208 the operator can key in new operating parameters such as the set point and operating state. Block 210 determines if there are instructions keyed in for new parameters. If so, block 212 inputs them to the controller memory. Block 214 determines if a preset idle time, e.g. 1 second, after the input of new parameters has elapsed. If so, the keyed in data is not used and the system reverts to its previous operator parameters in memory. Block 215 instructs to follow the input key data or the stored data depending on the elapsed idle time decision. Block 216 determines if the operator has selected the set-up mode, and if so, block 217 runs a set up task. If not, block 218 determines if a manual mode of operation is run by block 220. If so, the control system continues in a manual mode. If not, block 222 selects and runs an automatic mode. Block 223 initiates the register control task once the operating mode and operating parameters are selected. Block 224 reflects the operator option of producing a test voltage, e.g. a constant maximum output voltage output per block 226. If the test mode is not selected, block 228 determines if manual controls are selected. If so, block 220 determines if the operator has selected to output his keyed-in output voltage, and if so, block 232 outputs the selected voltage value. Block 234 next examines the line speed to see if it is too slow. If it is, block 236 sets flags for this condition and block 237 zeroes the print control variables. If not, block 238 determines if there is any scanner count. If there is none (count =0), register control is bypassed. If not, then block 240 acquires print control data from the selected internal routine.

Blocks 242–258 carry out the operations of blocks 120–124 in FIG. 6. Block 242 calculates the proportional error. Block 244 calculates the integral error. Blocks 246 and 248 scale the proportional and integral errors, respectively, in view of the system being controlled so that integral error take over occurs at a point X which results in system stability over the full anticipated range of operating speeds. Block 250 determines if the P and I errors differ in sign, and if so, block 252 determines if the proportional error exceeds a preset value, e.g. ±5% of the integral band. If it does, block 254 zeroes the integral error. After the zeroing loop, block 256 adds the proportional and integral errors and block 258 scales this composite error.

Block 260 decides if the control system is set to operate in a variable gain mode. If it is, the scaled composite error is scaled at block 262 for line speed. Block 264 then determines if the program is in an automatic mode. If it is, block 266 outputs an automatic voltage error signal corresponding to the scaled and varied composite error. The block 266 can also calculate and select the shortest path to bring the system into register, i.e. whether to advance or retard the web with respect to the cylinder, or vice versa.

The program then establishes the inspection zone. Block 268 initiates the calculation of the inspection zone. Blocks 270, 272 and 274 represent three determinations made prior to calculating the inspection zone at block 276. Block 270 determines if the line speed is too slow. If it is, a flag is set by block 278. Block 272 ensures that a homing pulse signal is present. If there is no homing signal, block 278 sets an informational flag. Finally, block 274 checks if a valid inspection zone has been established. If not, then block 280 calculates the desired inspection zone, preferably one beginning half way between the two most widely spaced scanner pulses, and block 282 then sets an informational flag. If there is already a valid inspection zone, there is an inquiry at block 284 as to whether the mark selection is done manually or automatically. If the mark selection is not manual, then block 286 calculates the position of the dead zone which precedes the inspection zone. As noted above, the dead zone is moved as the selected mark moves with respect to the homing pulse. This moves the inspection zone which begins when the dead zone ends. Once the dead zone is calculated, block 288 sets flags. The program runs repeatedly in a closed loop to continuously monitor and correct errors at a rate determined principally by the line speed, sample rate (related to line speed), and the response characteristics of the electronic and mechanical register controls.

Figure 9:
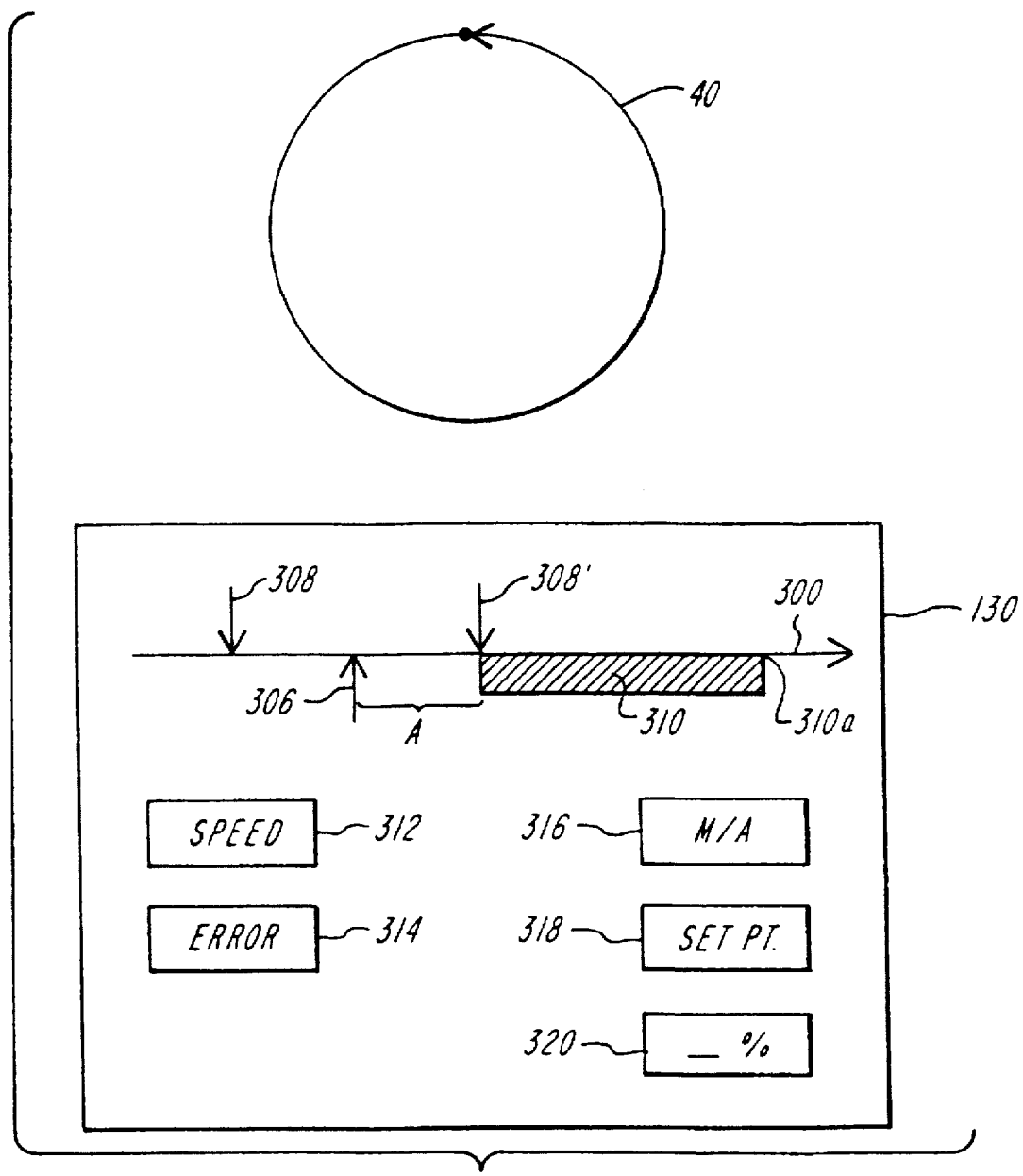
FIG. 9 is a view of the real-time analog display according to the present invention during operation of the finishing and control systems of FIGS. 1–8.

FIG. 9 shows the graphic display 130. A vector arrow 300 represents one complete revolution of a monitored function cylinder 40. The homing pulse is defined to be the head of the arrow. The length of the arrow 300 corresponds to the circumference of the cylinder 40 in one revolution. Depending on the printed web, this usually corresponds to one or two impressions. The direction of the arrow 300 corresponds to the direction of movement of the web.

Arrayed along the arrow 300 are indicia of the angular position, in one revolution, of the set point 306 and registration marks 308. Two marks 308,308' are shown, but it will be understood that the number will typically vary from one to three or more per revolution depending on the application. The position of each indicia 306,308,308' along the arrow 300 corresponds to its real-time angular position. Mark 308' is a selected mark. Register control is made to the mark 308', that is, the system is defined as being in register when the selected mark is aligned with the set point 306. The linear distance between the selected mark 308' and the set point 306 measured along the arrow 300 gives the operator a direct, analog, real-time visual display of the register error. This distance corresponds to an angular position error A. Its sign determines whether the error leads or lags the set point. With each revolution of the function cylinder the control system will ordinarily produce a correcting movement of the selected mark 308' toward the set point 306. This movement over time of this mark 308' on the display 130 therefore also gives the operator a direct, analog, real-time display of the correction process, particularly its speed and direction (momentum). This is believed to be unique in off-line web finishing control.

The display 130 also shows the real time position of the inspection zone 310. It preferably appears as a bar below and parallel to the arrow 300. It begins at 310a, a point half way between the two most widely spaced marks, and extends until it finds the selected mark 308'. The display moves the bar representation 310 of the inspection zone as the zone in fact moves to follow movement of the selected mark 308'.

By a manual "NEXT" command the operator can cause the system to shift the selected mark from the one currently selected to the next following mark. The inspection zone automatically follows this change, even if the inspection zone no longer begins half way between the two most widely spaced marks.

In the preferred form shown, the display 130 also has digital readouts 312, 314, 316, 318, 320 of the line speed, register error from the set point in mils, the operating mode, e.g. automatic or manual, the set point, and the rate in percent of the correction being applied, respectively.

FIG. 10 is a Bode plot of the system gain (dB) of the controls shown in FIGS. 5–9 graphed on a log scale as a function of frequency in radians per second. In particular, the lefthand graph shows the loop gain of the transfer function illustrated in FIG. 7B operating at 100 fpm and the righthand graph shows the loop gain of the transfer function illustrated in FIG. 7A operating at 1,000 fpm. The system is stable when operating between these graphs and within the upper and lower inflection points X,Y in the graphs. The upper points X are determined by the integral proportional gain ratio, and in particular, by when the integral gain becomes predominant, that is, "takes over" the control. The lower points Y are determined by the sample rate. The cross-over point is reflected by a gain of 1. In general, for a given system it is possible to adjust the ratio of the P and I gains by scaling to achieve a stable operation of the controls over a wide range of line speeds.

There has been described a register control apparatus and method that are highly stable when there are asynchronous errors, variations in the line speed, and large P error corrections to provide a rapid correction response. The system can attain register quickly and automatically from an asynchronous (out of register) start, as well as re-establish register during operation, as where there is an out-of-register splice or defective marks. The system does not require an operational dead zone around the set point. It allows the use of a low cost encoder, or other position transducer, an out-of-register splicer, and a single drive shaft, off-press web finishing line. The invention also provides an analog, real-time display of the correction process to enhance control.

While the invention has been described with respect to its preferred embodiments, it will be understood that various modifications and alterations will occur to those skilled in the art from the foregoing detailed description and the accompanying drawings. For example, in the web finishing application the control system can be used with a single or dual drive shaft, with a variable or fixed ratio between the drive shaft and the function cylinder, or with a mix of variable and fixed ratio machines on the same line and controlled by the same system. Further, while in the preferred embodiment the system gain is variable with line speed, other advantages can still be obtained if the controls are operated with a fixed gain. The invention can also be used for other register applications such as cut-off length control and in-feed tension control where it is not necessary to coordinate the position of a mark on a web with the operation of a function cylinder. More generally, this invention can register one moving or rotating element to another, e.g. to coordinate the rotation of two or more shafts or cylinders in printing or non-printing applications.

In implementing the control system, it will be understood by those skilled in the art that the specific circuit elements and digital software designs will vary from application to application. Different output signals (current, voltage, modulated), different inputs (two encoders, two Hall effect devices, one encoder and scanned registration marks), different actuators for the corrections, and many other system variables will dictate changes in implementation details, but within the overall control system described herein. Still further, while the control system has been described herein with what is principally a digital implementation, it will be understood that analog counterparts can be used, but in general with a loss of accuracy. For example, an integrating operational amplifier can sum error signals over a preset number of corrections to develop an integral error signal gain. These and other variations and modifications are intended to fall within the scope of the appended claims.

What is claimed is:

1. A control system to register the angular position of a rotatable member with respect to a moving series of indicia, said rotatable member having a homing position, comprising, means for scanning the indicia at a preselected sample rate to detect a selected one of said indicia and producing a first signal indicative of the presence of said selected indicia, means for sensing the angular position of the rotatable member and producing a second signal indicative of that angular position, means for comparing coincident ones of said first and second signals to produce an error signal whose magnitude and sign measure the magnitude and direction of any misregistration between the position of the selected indicia and a preselected angular position set point of the rotatable member, electronic means for processing said error signal to produce a correction signal comprising means for producing a gain that is proportional to the magnitude of the error signal, means for producing a gain that reflects the integrated error over a preceding number of said error signals, means for separately adjusting the proportional gain, the integral gain, and an overall gain which is the sum of the proportional and integral gains, and means for zeroing said integral gain when 1) the signs of said integral gain and said proportional gain differ and (ii) the proportional gain exceeds a preset percentage of the integral error band, and mechanical means responsive to said correction signal for continuously adjusting the mutual displacement of said selected indicia and said rotatable member to bring them into, and maintain, register.

2. The register control system of claim 1 further comprising means for determining the speed of travel of selected indicia, and wherein said overall gain adjusting varies as a function of said indicia travel speed.

3. The register control system of claim 1 wherein said angular position sensing means comprises an angular position transducer that produces multiple equally spaced position pulses with each revolution of the rotatable member, and further comprising digital electronic means for interpolating the angular position of said scanning and homing pulses between said position pulses.

4. The register control system of claim 3 wherein said digital electronic means includes a high frequency clock, and means for counting clock pulses between the each of said scanner and homing pulses and the immediately preceding and following transducer position pulses.

5. The register control system of claim 1 further comprising means for displaying for each revolution of said rotatable member, a vector arrow whose length represents the angular distance between successive homing pulses defined as the head of the arrow and whose direction represents the direction of indicia travel, a first marker displayed along said arrow at a position along said arrow corresponding to the angular position of the selected indicia with respect to that of the homing pulse, and a second marker displayed along said arrow indicative of the angular position of said set point with respect to said homing pulse, the displayed linear distance between said selected indicia first marker and said preselected angular position second marker providing a real-time analog representation of any said misregistration.

6. The register control system of claim 1 further comprising means for activating said first signal producing means intermittently during each revolution of said rotatable member thereby creating an inspection zone, and means for moving the inspection zone to correspond to movement of said selected indicia.

7. The register control system of claim 1 wherein said selected indicia are a series of registration marks on a preprinted web and said rotatable member is a function cylinder that acts on the web.

8. A control process for registering the angular position of a rotatable member with respect to a moving series of indicia, said rotatable member having a homing position, comprising, scanning the indicia at a preselected sample rate to detect a selected one of said indicia, producing a first signal responsive to said scanning indicative of the presence of said selected indicia, sensing the angular position of the rotatable member, producing a second signal responsive to said sensing indicative of that angular position, comparing coincident ones of said first and second signals to produce an error signal whose magnitude and sign measure the magnitude and direction of any misregistration between the position of the selected indicia and a preselected angular position set point of the rotatable member, electronically processing said error signal to produce a correction signal comprising:
    (i) producing a gain that is proportional to the magnitude of the error signal,
    (ii) producing a gain that reflects the integrated error over a preceding number of said error signals,
    (iii) separately adjusting the proportional gain, the integral gain and an overall gain which is the sum of the proportional and integral gains, and
    (iv) zeroing said integral gain when 1) the signs of said integral gain and said proportional gain differ and (ii) the proportional gain exceeds a preset percentage of the integral error band, and continuously mechanically adjusting the mutual displacement of said selected indicia and said rotatable member in response to said correction signal to bring them into, and maintain, register.

9. The register control process of claim 8 further comprising determining the speed of travel of selected indicia, and varying said overall gain as a function of said indicia travel speed.

10. The register control process of claim 8 wherein said angular position sensing comprises producing multiple equally angularly spaced position pulses with each revolution of the rotatable member, and digitally interpolating the angular position of said scanned and homing pulses between said position pulses.

11. The register control process of claim 10 wherein said digital interpolating includes counting clock pulses between each of said scanned and homing pulses and the immediately preceding and following position pulses.

12. The register control process of claim 8 further comprising the step of displaying for each revolution of said rotatable member a vector arrow whose length represents the angular distance between successive homing positions defined as the head of the arrow and whose direction represents the direction of indicia travel, a first marker displayed along said arrow whose position along said arrow corresponds to the angular position of the selected indicia with respect to said homing pulse, a second marker displayed along said arrow indicative of the angular position of a set point with respect to said homing pulse, the displayed linear distance between said selected indicia marker and said preselected angular position marker providing a real-time analog representation of any said misregistration.

13. The register control process of claim 8 further comprising the steps of activating said first signal producing intermittently during each revolution of said rotatable member thereby creating an inspection zone during said activation, and moving the inspection zone to correspond with movement of said selected indicia.

14. The register control process of claim 8 wherein said selected indicia are a series of registration marks on a pre-printed web and said rotatable member is a function cylinder that acts on the web.

15. A process to control asynchronous misregistration between the angular position of a rotatable member and a moving series of indicia, said rotatable member having a homing position, the process scanning said indicia to detect a selected one of said indicia, producing a first signal in response to said detecting indicative of the presence of said selected indicia, sensing the angular position of the rotatable member, producing a second signal in response to said sensing indicative of that angular position, comparing coincident ones of said first and second signals to produce an error signal whose magnitude and sign measure the magnitude and direction of any misregistration between the position of the selected indicia and a preselected angular position of the rotatable member, processing said error signal to produce a correction signal, and continuously adjusting the mutual displacement of said selected indicia and said rotatable member in response to said correction signal to bring them into register, comprising activating said first signal producing intermittently during each revolution of said rotatable member to produce an inspection zone that precedes and includes said selected indicia, and moving said inspection zone in coordination with the asynchronous movement of said selected indicia with respect to said homing pulse.

16. The register control process of claim 15 wherein each said inspection zone begins generally midway between the two most widely spaced of said indicia in a given revolution of said rotatable member and terminates upon detection of one of said selected indicia.

17. A high accuracy system for measuring the angular position of a rotatable member comprising an angular position transducer that produces multiple equally angularly spaced first pulses with each revolution of the rotatable member, and digital electronic means for interpolating the angular position of the rotating member at a given angular position between two adjacent ones of said first pulses using measurements of a time interval $\Delta T1$ for the rotating member to rotate from a first one of said adjacent first pulses to said given angular position and interval $\Delta T2$ for the rotatable member to rotate from said given angular position to the second of said adjacent first pulses.

18. The high accuracy measurement system of claim 17 wherein said given angular position is identified by a second pulse, wherein said digital electronic means includes a high frequency clock, means for separately counting pulses emitted by said clock during said time intervals $\Delta T1$ and $\Delta T2$, and means for forming a ratio of said counts.

19. The high accuracy measurement system of claim 18 further including means for measuring the time intervals between two adjacent pairs of first transducer pulses where one of said pairs precedes said interval $\Delta T1$ and the others of said pairs follows the interval $\Delta T2$, and means for averaging these preceding and following intervals to measure the interval therebetween that includes said given angular position.

20. A real-time, two-dimensional, analog display of a system that controls the register between the angular position of a rotatable member and a moving series of selected indicia, said rotatable member having a homing position, and said system scanning the selected indicia to detect said selected indicia and producing a first signal indicative of the presence of said selected indicia, sensing the angular position of the rotatable member and producing a second signal indicative of that angular position, and comparing coincident ones of said first and second signals to produce an error signal whose magnitude and sign measure the magnitude and direction of any misregistration between the position of the selected indicia and a preselected set point angular position of the rotatable member, processing said error signal to produce a correction signal, comprising, a vector arrow whose length represents the angular distance between successive homing positions defined as the head of the arrow and whose direction represents the direction of indicia travel, a first marker displayed along said arrow whose position along said arrow corresponds to the angular position of the selected indicia with respect to that of said homing pulse, and a second marker displayed along said arrow indicative of the angular position of said set point with respect to said homing pulse, wherein the displayed linear distance between said first and second markers provide a real-time analog representation of any said misregistration.

21. The real-time, two-dimensional, analog display of claim 20 wherein said first signal producing is activated periodically during each revolution of said rotatable member and further comprising a bar arrayed along said vector arrow whose length and position with respect to the arrow corresponds to an inspection zone where said first signal producing is activated.

22. The real-time, two-dimensional, analog display of claim 21 wherein the position of said markers and inspection zone are redisplayed with each revolution of said rotatable member to produce an analog visual representation of the register correction.

* * * * *